Patented Sept. 21, 1954

2,689,837

UNITED STATES PATENT OFFICE 2,689,837

FUNGI AND BACTERIA RESISTANT POLYVINYL HALIDE COMPOSITIONS

Joseph R. Darby, Richmond Heights, and Elmer E. Cowell, St. Louis, Mo., assignors to Monsanto Chemical Company, St. Louis, Mo., a corporation of Delaware No Drawing. Application March 2, 1951,
Serial No. 213,666

12 Claims. (Cl. 260—30.8)

This invention relates to improved resinous compositions containing polymerized vinyl halide. More particularly, this invention relates to an improved process for the preparation of plasticized resinous compositions having improved resistance to deterioration due to attack by such micro-organisms as fungi and bacteria, and containing polymerized vinyl halide, copolymers containing combined vinyl halide, or combinations thereof containing combined vinyl halide, collectively and broadly referred to herein as "polyvinyl halide compositions."

Polyvinyl halide compositions have found many useful applications because of their wide range of elastomeric and mechanical properties coupled with their extreme resistance to oxidation, organic solvents, acids and alkalies. Typical of such applications are calendered films and sheeting for wearing apparel, shower curtains and seat and cushion coverings. In such applications, polyvinyl halide compositions have found utility as a free or unsupported film but more frequently polyvinyl halide compositions have been used to coat such textiles as cotton, wool, silk, rayon, and nylon thereby obtaining a composition or fabric for use in the above mentioned applications which combines the desirable properties of the textile and the desirable properties of the polyvinyl halide composition. Such polyvinyl halide compositions frequently contain plasticizers or stabilizers which have their origin in animal or vegetable sources, or the base material of coated compositions frequently contains materials which have their origin in animal or vegetable sources which thereby render the resultant composition quite susceptible to deteriorating attack by such micro-organisms as fungi and bacteria. Such deterioration of polyvinyl halide compositions or polyvinyl halide coated compositions seriously hinders full scale utility of the compositions particularly in those areas and those applications which are conducive to such an attack.

Copper 8-quinolinolate is a well known fungicide and bactericide, and repeated attempts have been made to incorporate this material into polyvinyl halide compositions in order to render such compositions resistant to attacks by fungi and bacteria. It has been found, however, that copper 8-quinolinolate is exceedingly incompatible with polyvinyl halide compositions. According to the methods as heretofore practiced, if even minor amounts, of the order of 0.2% by weight of total composition, are incorporated into a plasticized polyvinyl halide composition, within several hours after preparation of the composition the copper 8-quinolinolate begins to crystallize or bloom on the surface of the composition indicating incompatibility and rendering the composition unfit for use.

A more recent development in the field of fungi and bacteria resistant plasticized polyvinyl halide compositions has been the discovery of the use of N-alkyl arylsulfonamides as a compatibilizing agent for copper 8-quinolinolate in such compositions. According to this procedure, a compatible plasticized polyvinyl halide composition containing copper 8-quinolinolate is prepared by incorporating therein an N-alkyl aryl sulfonamide. While this procedure has been most successful in many applications, a surprising phenomenon has been found to exist. It has been observed that if such a composition is utilized in an application which prevents the composition from being exposed to ultra-violet light, after a period of time copper 8-quinolinolate begins to exude or crystallize upon the surface of the composition, thereby indicating incompatibility. Thus, if such compositions are utilized as the insulation or coating for wires which will be constantly kept underground or sealed in the walls of buildings, or if such compositions are used as the inside coating for tent fabrics in which applications the compositions will never be subject to the effects of ultra-violet light, after a short period of time copper 8-quinolinolate can be observed crystallizing upon the surface of such compositions.

It is an object of this invention, therefore, to provide an improved process for the preparation of plasticized polyvinyl halide compositions having incorporated therein copper 8-quinolinolate so as to render them resistant to attack by fungi and bacteria, which compositions will remain compatible and homogeneous with no evidence of crystallization or blooming of the copper 8-quinolinolate under any conditions of application or use. Further objects will become apparent from the description of the novel process of this invention.

According to the process heretofore used, fungi and bacteria resistant plasticized polyvinyl halide compositions have been prepared by merely mixing the resin, the plasticizer, copper 8-quinolinolate and the compatibilizing agent as one mixture under the influence of heat or in a suitable solvent until a homogeneous mass was obtained. Compositions so prepared develop incompatibility in the absence of the effects of ultra-violet light as previously indicated. It has now been discovered that if the plasticizer, copper 8-quinolinolate and the compatibilizing agent are first mixed in the presence of heat to form a substantially homogeneous composition, and the homogeneous composition thus obtained then incorporated into the particular polyvinyl halide resin desired, a fungi and bacteria resistant plasticized polyvinyl halide composition results which will remain compatible even in the absence of ultra-violet radiation. According to the novel process of this invention, therefore, compatible fungi and bacteria resistant plasticized polyvinyl halide compositions are prepared, which compositions will retain their compatibility and homogeneity even in those applications wherein they are not subjected to the effect of ultra-violet radiation, by incorporating into the vinyl halide polymer utilized in the composition, a substantially homogeneous composition obtained by heating a mixture comprising a plasticizer for said resin, a minor amount of copper 8-quinolinolate and a compound selected from the group consisting of N-alkyl benzenesulfonamides and N-alkyl toluenesulfonamides wherein the alkyl group contains at least 1 and not more than 8 carbon atoms.

The following examples are illustrative, but not limitative of the novel process of this invention. All parts are parts by weight unless otherwise noted.

*Example I*

100 parts of polyvinyl chloride, 2.5 parts of tricresyl phosphate, 2.5 parts of butyl acetyl ricinoleate and 1 part of copper 8-quinolinolate are mixed together at room temperature in a suitable container. The mixture is then placed on a differential speed roll mill and further mixed and fluxed for 5 minutes at 160° C. At the end of this time, a homogeneous composition is formed which is sheeted off the roll mill. 0.040 inch thick sheets of the composition so prepared are then molded at a temperature of 160° C. under a pressure of 2000 pounds per square inch. Shortly after removal from the mold, crystals of copper 8-quinolinolate can be observed on the surface of the composition thereby indicating incompatibility of the copper 8-quinolinolate.

*Example II*

The procedure set forth in Example I is repeated utilizing in addition to the ingredients set forth therein, 5 parts of N-methyl benzensulfonamide. The molded specimen when removed from the mold is free of any signs of blooming or crystallization, thereby indicating a compatible composition. In order to further test the compatibility of the composition so prepared, specimens molded as above described are allowed to stand on a table in ordinary daylight. Similar specimens are placed in a closed cabinet from which all daylight is excluded. After about 30 days, the specimens which are exposed to daylight are free of any signs of blooming or crystallization, indicating a compatible composition, whereas the compositions which are kept in the cabinet from which daylight is excluded, exhibit crystallization or blooming of copper 8-quinolinolate on the surface of the composition, thereby indicating that the copper 8-quinolinolate has become incompatible with the resinous composition.

*Example III*

2.5 parts of tricresyl phosphate, 2.5 parts of butyl acetyl ricinoleate, 5 parts of N-methyl benzenesulfonamide and 1 part of copper 8-quinolinolate are placed in a suitable container, heated to a temperature of about 160° C. and stirred until a homogeneous mixture results. The homogeneous liquid composition thus obtained is then mixed with 100 parts of polyvinyl chloride and placed on a differential speed roll mill and further mixed and fluxed for 5 minutes at 160° C. The resulting composition is then molded as described in Example I. The molded specimens are free of any signs of blooming or crystallization, thereby indicating a compatible composition. Specimens of the molded composition thus prepared are allowed to stand in the presence of daylight while similar specimens are placed in a cabinet from which daylight is excluded. After 90 days the specimens which have been allowed to stand in the presence of daylight and those specimens which have been allowed to stand in the absence of daylight are free from any signs of blooming or crystallization, thereby indicating completely compatible compositions. It is evident, therefore, that the preheating treatment applied to the plasticizer mixture prior to incorporation into the polyvinyl chloride resin permitted the preparation of a compatible plasticized polyvinyl halide composition having incorporated therein copper 8-quinolinolate, which composition retained its compatibility even on prolonged standing in the absence of ultra-violet light.

*Example IV*

A composition comprising 100 parts of polyvinyl chloride, 25 parts of tricresyl phosphate, 25 parts of butyl acetyl ricinoleate, and 0.2 part of copper 8-quinolinolate is processed in the manner described in Example I. The molded specimen exhibits blooming and a crystal formation on the surface thereby indicating that copper 8-quinolinolate was incompatible in this composition.

*Example V*

The procedure set forth in Example IV is repeated utilizing in addition to the ingredients set forth therein, 5 parts of N-6-methylheptyl benzenesulfonamide. The molded specimen when removed from the mold is free of any signs of blooming or crystallization, thereby indicating a compatible composition. Specimens of the molded composition are allowed to stand on a table in ordinary daylight while similar specimens are placed in a closed cabinet from which all daylight is excluded. After about 30 days, the specimens which are exposed to daylight are free of any signs of blooming or crystallization whereas the specimens which are kept in the cabinet from which daylight is excluded exhibit crystallization or blooming of copper 8-quinolinolate on the surface of the composition.

*Example VI*

25 parts of tricresyl phosphate, 25 parts of butyl acetyl ricinoleate, 5 parts of N-6-methylheptyl benzenesulfonamide and 0.2 part of copper 8-quinolinolate are placed in a suitable container, heated to a temperature of about 160° C. and stirred until a homogeneous mixture results. The homogeneous liquid composition thus obtained is then mixed with 100 parts of polyvinyl chloride and placed on a differential speed roll mill and further mixed and fluxed for about 5 minutes at 160° C. The resulting homogeneous composition is then molded as described in Example I. The molded specimens are free of any signs of blooming or crystallization. Specimens of the molded composition thus prepared are allowed to stand in the presence of daylight while similar specimens are placed in a cabinet from which daylight is excluded. After 90 days the specimens which have been allowed to stand in the presence of daylight and those specimens which have been allowed to stand in the absence of daylight are free from any signs of blooming or crystallization, thereby indicating completely compatible compositions.

*Example VII*

In accordance with the procedure described in Example VI, a composition was prepared containing 100 parts of polyvinyl chloride, 25 parts of tricresyl phosphate, 25 parts of butyl acetyl ricinoleate, 10 parts of N-ethyl-p-toluenesulfonamide and 1 part of copper 8-quinolinolate. The composition thus prepared evidences no signs of incompatibility even when retained for prolonged periods of time in the absence of daylight.

A cotton duck fabric is coated with the composition described in Example VII by the calendering method which consists in simultaneously passing the fabric and the polyvinyl chloride composition through a conventional four-roll calender. The coated cotton duck fabric in addition to possessing the desirable characteristics of the fabric and the polyvinyl chloride coating, is extremely resistant to attack by fungi and bacteria by virtue of the composition having incorporated therein copper 8-quinolinolate.

*Example VIII*

A composition comprising 100 parts of polyvinyl chloride, 25 parts of dioctyl phthalate and 1.5 parts of copper 8-quinolinolate, is prepared by the manner described in Example I. The molded specimen exhibits blooming and crystallization on the surface indicating the incompatibility of copper 8-quinolinolate in this composition.

*Example IX*

The procedure set forth in Example VIII is repeated utilizing in addition to the ingredients set forth therein, 10 parts of N-butyl-o-toluenesulfonamide. Molded specimens of the composition thus prepared are allowed to stand in the presence of daylight while similar specimens of the molded compositions are allowed to stand in the absence of daylight. Those compositions which are subjected to daylight or ultra-violet light after a period of time show no signs of incompatibility, while those compositions which are allowed to stand in the absence of daylight, after a period of time begin to show incompatibility.

*Example X*

25 parts of dioctyl phthalate, 10 parts of N-butyl-o-toluenesulfonamide and 1.5 parts of copper 8-quinolinolate are placed in a suitable container, heated to a temperature of 160° C. and stirred until a homogeneous mixture results. The homogeneous liquid composition thus obtained is then mixed with 100 parts of polyvinyl chloride and placed on a differential speed roll mill and further mixed and fluxed for 5 minutes at 160° C. The resulting homogeneous composition is then molded as described in the preceding examples. Specimens of the molded composition are allowed to stand in the presence of daylight while similar specimens are allowed to stand in the absence of daylight. After prolonged standing under such conditions, neither specimen shows any signs of incompatibility.

*Example XI*

The procedure set forth in Example X is repeated utilizing 100 parts of dioctyl phthalate in place of the 25 parts of dioctyl phthalate. The molded specimens thus obtained are compatible and retain their compatibility even after prolonged standing in ultra-violet light.

*Example XII*

The procedure set forth in Example X is repeated utilizing the following ingredients:

100 parts of polyvinyl chloride
12.5 parts of dioctyl phthalate
12.5 parts of butyl acetyl ricinoleate
5 parts of copper 8-quinolinolate
30 parts of N-2-ethylhexyl-p-toluenesulfonamide The resulting composition is completely compatible even after prolonged standing in the absence of ultra-violet light. When a composition utilizing the above described ingredients is prepared in accordance with Example II, molded specimens thereof which are allowed to stand in the presence of ultra-violet light show no signs of incompatibility after prolonged standing, whereas samples which are allowed to stand in the absence of ultra-violet light show incompatibility after long standing.

*Example XIII*

The procedure set forth in Example X is repeated utilizing the following ingredients:

100 parts of polyvinyl chloride
12.5 parts of dioctyl phthalate
12.5 parts of butyl acetyl ricinoleate
2 parts of copper 8-quinolinolate
50 parts of N-hexyl benzenesulfonamide The resulting composition is completely compatible even after prolonged standing in the absence of ultra-violet light. When a composition utilizing the above described ingredients is prepared in accordance with Example II, molded specimens thereof which are allowed to stand in the presence of ultra-violet light show no signs of incompatibility after prolonged standing, whereas samples which are allowed to stand in the absence of ultra-violet light show incompatibility after long standing.

*Example XIV*

The procedure set forth in Example X is repeated utilizing the following ingredients:

100 parts of polyvinyl chloride
12.5 parts of dioctyl phthalate
12.5 parts of butyl acetyl ricinoleate
2 parts of copper 8-quinolinolate
30 parts of N-isopropyl benzenesulfonamide The resulting composition is completely compatible even after prolonged standing in the absence of ultra-violet light. When a composition utilizing the above described ingredients is prepared in accordance with Example II, molded specimens thereof which are allowed to stand in the presence of ultra-violet light show no signs of incompatibility after prolonged standing, whereas samples which are allowed to stand in the absence of ultra-violet light show incompatibility after long standing.

*Example XV*

The procedure set forth in Example X is repeated utilizing the following ingredients:

100 parts of polyvinyl chloride
12.5 parts of dioctyl phthalate
12.5 parts of butyl acetyl ricinoleate
2 parts of copper 8-quinolinolate
30 parts of N-isopropyl-p-toluenesulfonamide The resulting composition is completely compatible even after prolonged standing in the absence of ultra-violet light. When a composition utilizing the above described ingredients is prepared in accordance with Example II, molded specimens thereof which are allowed to stand in the presence of ultra-violet light show no signs of incompatibility after prolonged standing, whereas samples which are allowed to stand in the absence of ultra-violet light show incompatibility after long standing.

Example XVI

The procedures set forth in Examples VIII, IX and X are repeated utilizing in place of the polyvinyl chloride a polymerized vinyl resin containing 90 parts of combined vinyl chloride and 10 parts of combined vinyl acetate. The properties of the compositions thus prepared are similar to those obtained in Examples VIII, IX and X.

The procedures set forth in Examples VIII, IX and X are repeated utilizing in place of the polyvinyl chloride a polymerized vinyl resin containing 90 parts of combined vinyl chloride and 10 parts of diethyl maleate. The properties of the compositions thus prepared are similar to those obtained in Examples VIII, IX and X.

Examples I, IV, VIII and XV (in part) as hereinbefore set forth very clearly indicate the extreme incompatability of copper 8-quinolinolate in polyvinyl halide compositions when such compositions are prepared according to the methods heretofore practiced. Examples II, V, IX, XII (in part), XIII (in part), XIV (in part) and XV (in part) illustrate the phenomenon of the compatibility of certain plasticized polyvinyl halide compositions containing copper 8-quinolinolate in the presence of ultra-violet light and the unusual incompatibility of such compositions in the absence of ultra-violet light when such compositions are prepared in accordance with recently developed processes. Examples III, VI, VII, X, XI, XII (in part), XIII (in part), XIV (in part) and XV (in part) are indicative of the outstanding compatability of copper 8-quinolinolate in plasticized polyvinyl halide compositions obtained when prepared in accordance with the process of this invention whereby compositions are obtained which remain fully compatible even when retained for long periods of time in the absence of ultra-violet light.

Samples of the polyvinyl chloride coated fabric prepared in Example VII and unsupported polyvinyl chloride films prepared from the compositions set forth in Examples VI and X are inoculated with each of the following organisms:

*Chaetomium globosum,* Metarrhizium sp., *Aspergillus niger* and Penicillium sp. and then incubated for 36 hours.

Results of this biological test were as follows:

| Organism | Fungus Activity on the Sample |
| --- | --- |
| Chaetomium globosum | No growth of the organism on the sample. |
| Metarrhizium sp | Do. |
| Aspergillus niger | Do. |
| Penicillium sp | Do. |

A further unsupported polyvinyl chloride film was prepared containing 100 parts of polyvinyl chloride, 25 parts of tricresyl phosphate and 25 parts of butyl acetyl ricinoleate. When this composition was inoculated with the above mentioned organisms, a severe growth of the organism took place on the sample, indicating the outstanding fungi and bacteria resistant characteristics of the novel compositions of this invention.

While various specific embodiments of the novel process of this invention have been particularly illustrated in the preceding examples, it will be obvious to those skilled in the art that substantial variation from the conditions set forth in these examples is possible without departing from the scope of this invention. For example, in order to obtain fungi or bacteria resistant polyvinyl halide compositions, it is preferable that such compositions contain from about 0.1 to about 2.5 parts by weight of copper 8-quinolinolate per 100 parts of polymerized vinyl halide resin. At times, under severe conditions, it is desirable to increase the copper 8-quinolinolate content to about 5 parts by weight per 100 parts of resin or even to 10 parts by weight per 100 parts of resin.

The compositions prepared by the novel process of this invention may contain any plasticizer for the polymerized vinyl halide resin utilized in the composition, and the quantity of the plasticizer utilized may be varied over a substantial range. Particularly advantageous compositions are those which contain from about 5 parts to about 150 parts by weight of the plasticizer per 100 parts of the polymerized vinyl halide resin. Typical of the various plasticizers which may be utilized in the compositions prepared by the process of this invention are the aryl alkane sulfonates; the various esters of phthalic acid such as dibutyl phthalate, dioctyl phthalate, dinonyl phthalate, and alkyl benzyl phthalates; the various esters of orthophosphoric acid such as the alkyl diaryl phosphates, tricresyl phosphate, trioctyl phosphate, etc.; esters of aliphatic dicarboxylic acids such as dibutyl sebacate, dioctyl adipate, etc.; alkyl phthalyl alkyl glycolates such as butyl phthalyl butyl glycolate, etc.; and resinous plasticizers such as the condensation products of polycarboxylic acids and polyhydric alcohols.

In addition to the usual plasticizers for polyvinyl halide resins, the compositions prepared according to the process of this invention may also have incorporated therein various pigments, fillers, stabilizers, both heat and light, etc.

The N-alkyl arylsulfonamides which may be utilized in the compositions prepared by the novel process of this invention are represented by the following formula

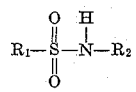

wherein $R_1$ is a phenyl or cresyl radical and $R_2$ is an alkyl radical containing at least 1 and not more than 8 carbon atoms. Typical of the N-alkyl arylsulfonamides which can be so utilized are the following:

N-methyl benzenesulfonamide
N-ethyl benzenesulfonamide
N-isopropyl benzenesulfonamide
N-butyl benzenesulfonamide
N-isobutyl benzenesulfonamide
N-tert-butyl benzenesulfonamide
N-hexyl benzenesulfonamide
N-capryl benzenesulfonamide
N-6-methylheptyl benzenesulfonamide
N-2-ethylhexyl benzenesulfonamide
N-methyl-o-toluenesulfonamide
N-ethyl-p-toluenesulfonamide
N-isopropyl m-toluenesulfonamide
N-butyl-o-toluenesulfonamide N-tert-butyl-p-toluenesulfonamide
N-iso-butyl-p-toluenesulfonamide
N-hexyl-o-toluenesulfonamide
N-capryl-p-toluenesulfonamide
N-6-methylheptyl-p-toluenesulfonamide
N-2-ethylhexyl-p-toluenesulfonamide The quantity of the N-alkyl arylsulfonamide utilized in the composition prepared by this invention may be varied over a substantial range. Particularly advantageous compositions are those containing from about 1 to about 50 parts by weight, and preferably from about 1 to about 10 parts by weight, of the N-alkyl arylsulfonamide per 100 parts of the polyvinyl halide resin.

As indicated by the examples, copolymers of a vinyl halide and other unsaturated materials copolymerizable therewith may be utilized in the novel process of this invention. For example, copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chloro-styrene, para-chlorostyrene, 2,5-dichlorostyrene, 2,4-dichlorostyrene, para-ethyl styrene, divinyl benzene, vinyl naphthanate, alpha-methyl styrene, dienes, such as butadiene, chloroprene; amides, such as acrylic acid amide, acrylic acid anilide; nitriles, such as acrylic acid nitrile; esters of alpha, beta-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion i. e., more than 50% by weight, of the copolymer is made from vinyl chloride, represents a preferred class of polymers to be utilized in this invention.

A particularly preferred embodiment of this invention comprises the use of a polymer prepared by copolymerizing vinyl chloride and an ester of an alpha, beta-unsaturated dicarboxylic acid, such as diethyl maleate, in which 5 to 20 parts by weight of diethyl maleate are utilized for every 95 to 80 parts by weight of vinyl chloride. Among the preferred esters of alpha, beta-unsaturated dicarboxylic acids are the alkyl esters in which the alkyl group contains from 1 to 8 carbon atoms.

In addition to the above described vinyl chloride-containing polymers, similar polymers wherein the vinyl chloride is replaced, either in whole or in part, by other vinyl halides may be utilized. Typical of such other vinyl halides are vinyl bromide, vinyl fluoride, etc.

The compositions prepared according to the novel process of this invention may be effectively utilized to produce free or unsupported polyvinyl halide films and sheeting which will be resistant to the deteriorating effects of fungi and bacteria. These compatible compositions may also be applied as a coating to various textiles, such as, cotton, wool, rayon, silk, and nylon, and natural, synthetic, and artificial leathers. These compositions may be so applied by any of the well known methods used to apply polyvinyl chloride coatings, such as the conventional calendering, solvent coating, or dip coating methods. Such coated compositions, wherein the novel compositions of this invention are utilized, in addition to possessing the desirable characteristics of the base material and the polyvinyl chloride coatings, are thereby rendered extremely resistant to deterioration due to attack by fungi and bacteria.

As indicated in the examples, according to the novel process of this invention compatible plasticized polyvinyl halide compositions are prepared by first preparing a substantially homogeneous mixture of the plasticizer, N-alkyl arylsulfonamide and copper 8-quinolinolate which are to be utilized in the resinous composition and then incorporating this homogeneous mixture into the particular polyvinyl halide resin. The preparation of this homogeneous mixture of plasticizer, copper 8-quinolinolate and compatibilizing agent is accomplished by merely mixing the ingredients with heating until a substantially homogeneous composition results. The temperature during this heating period may be varied over a substantial range and any elevated temperature which will permit the preparation of the homogeneous mixture without any decomposition of the mixture may be utilized. Temperatures in excess of about 100° C. are applicable although temperatures in the range of from about 140° C. to about 200° C. are particularly advantageous. Lower temperatures may be utilized but longer periods of time may be required in such cases to effect substantially complete homogeneity. Similarly, temperatures higher than 200° C. may be utilized if desired.

By a substantially homogeneous mixture of the plasticizer, copper 8-quinolinolate and compatibilizing agent is meant either a substantially complete solution or a dispersion of the copper 8-quinolinolate in the plasticizer and compatibilizing agent which dispersion is macroscopically and substantially homogeneous although microscopically it may be of a heterogeneous nature. In preparing this substantially homogeneous mixture of the plasticizer, copper 8-quinolinolate and compatibilizing agent, it is to be understood that all of the plasticizer and compatibilizing agent which is to be ultimately utilized in the finished plasticized polyvinyl halide composition need not be utilized in preparing the initially substantially homogeneous mixture unless such is so desired. Thus, for example, a substantially homogeneous mixture of copper 8-quinolinolate and a portion of the plasticizer and compatibilizing agent may be prepared which may then be incorporated into the polymerized vinyl halide resin together with additional quantities of plasticizer and compatibilizing agent.

After the homogeneous mixture of the plasticizer, N-alkyl arylsulfonamide resin and copper 8-quinolinolate has been prepared, this mixture may be incorporated into the particular polymerized vinyl halide resin utilized according to any method commonly used and well known to those skilled in the art. Thus, the homogeneous mixture of plasticizer, copper 8-quinolinolate and compatibilizing agent may be incorporated with the polyvinyl halide resin on a mixing or differential speed roll mill or in an internal mixer. This homogeneous mixture may also be added to the latex of the resin, to an emulsion of the vinyl halide monomer prior to polymerization to form the resin, or to a solution of the polymerized vinyl halide resin in a suitable solvent.

What is claimed is:

1. A process for preparing fungi and bacteria resistant vinyl halide-containing polymeric compositions which comprises incorporating into a vinyl halide-containing polymer in which more than 50% by weight is made from a vinyl halide a substantially homogeneous composition obtained by heating a mixture comprising a plasticizer for said resin, an N-alkyl arylsulfonamide selected from the group consisting of N-alkyl benzenesulfonamides and N-alkyl toluenesulfonamides wherein the alkyl substituent contains at least 1 and not more than 8 carbon atoms, and a minor but effective amount of copper 8-quinolinate, the amount of N-alkyl arylsulfonamide being sufficient to compatibilize the copper 8-quinolinate in the resin composition.

2. A process for preparing fungi and bacteria resistant vinyl halide-containing polymeric compositions which comprises incorporating into a vinyl halide-containing polymer in which more than 50% by weight is made from a vinyl halide a substantially homogeneous composition obtained by heating at a temperature in excess of about 100° C. a mixture comprising a plasticizer for said resin, from about 1 to about 50 parts by weight of an N-alkyl arylsulfonamide selected from the group consisting of N-alkyl benzenesulfonamides and N-alkyl toluenesulfonamides wherein the alkyl substituent contains at least 1 and not more than 8 carbon atoms per 100 parts of said resin, and from about 0.1 to about 10 parts by weight of copper 8-quinolinate per 100 parts of said resin.

3. A process for preparing fungi and bacteria resistant vinyl halide-containing polymeric compositions which comprises incorporating into a vinyl halide-containing polymer in which more than 50% by weight is made from a vinyl halide a substantially homogeneous composition obtained by heating at a temperature in the range of from about 140° C. to about 200° C. a mixture comprising a plasticizer for said resin, from about 1 to about 10 parts by weight of an N-alkyl arylsulfonamide selected from the group consisting of N-alkyl benzenesulfonamide and N-alkyl toluenesulfonamides wherein the alkyl substituent contains at least 1 and not more than 8 carbon atoms per 100 parts of said resin, and from about 0.1 to about 5 parts by weight of copper 8-quinolinate per 100 parts of said resin.

4. A process for preparing fungi and bacteria resistant vinyl chloride-containing polymeric compositions which comprises incorporating into a vinyl chloride-containing polymer in which more than 50% by weight is made from vinyl chloride a substantially homogeneous composition obtained by heating at a temperature in excess of about 100° C. a mixture comprising a plasticizer for said resin, from about 1 to about 10 parts by weight of an N-alkyl arylsulfonamide selected the group consisting of N-alkyl benzenesulfonamide and N-alkyl toluenesulfonamides wherein the alkyl substituent contains at least 1 and not more than 8 carbon atoms per 100 parts of said resin, and from about 0.1 to about 5 parts by weight of copper 8-quinolinate per 100 parts of said resin.

5. A process for preparing fungi and bacteria resistant vinyl chloride-containing polymeric compositions which comprises incorporating into a vinyl chloride-containing polymer in which more than 50% by weight is made from vinyl chloride a substantially homogeneous composition obtained by heating at a temperature in the range of from about 140° C. to about 200° C. a mixture comprising a plasticizer for said resin, from about 1 to about 10 parts by weight of an N-alkyl arylsulfonamide selected from the group consisting of N-alkyl benzenesulfonamide and N-alkyl toluenesulfonamides wherein the alkyl substituent contains at least 1 and not more than 8 carbon atoms per 100 parts of said resin, and from about 0.1 to about 5 parts by weight of copper 8-quinolinolate per 100 parts of said resin.

6. A process as described in claim 5 wherein the vinyl chloride-containing polymer is polyvinyl chloride.

7. A process as described in claim 5 wherein the vinyl chloride-containing polymer is a copolymer of vinyl chloride and unsaturated materials copolymerizable therewith.

8. A process as described in claim 5 wherein the vinyl chloride-containing polymer is a copolymer of vinyl chloride and vinyl acetate.

9. A process as described in claim 5 wherein the vinyl chloride-containing polymer is a copolymer of vinyl chloride and diethyl maleate in which at least about 80% by weight is made from vinyl chloride.

10. A process for preparing fungi and bacteria resistant vinyl chloride-containing polymeric compositions which comprises incorporating into polyvinyl chloride a substantially homogeneous composition obtained by heating at a temperature in the range of from about 140° C. to about 200° C. a mixture comprising a plasticizer for polyvinyl chloride, from about 1 to about 10 parts by weight of N-ethyl toluenesulfonamide per 100 parts of polyvinyl chloride, and from about 0.1 to about 5 parts by weight of copper 8-quinolinolate per 100 parts of polyvinyl chloride.

11. A process for preparing fungi and bacteria resistant vinyl chloride-containing polymeric compositions which comprises incorporating into polyvinyl chloride a substantially homogeneous composition obtained by heating at a temperature in the range of from about 140° C. to about 200° C. a mixture comprising a plasticizer for polyvinyl chloride, from about 1 to about 10 parts by weight of N-isopropyl benzenesulfonamide per 100 parts of polyvinyl chloride, and from about 0.1 to about 5 parts by weight of copper 8-quinolinolate per 100 parts of polyvinyl chloride.

12. A process for preparing fungi and bacteria resistant vinyl chloride-containing polymeric compositions which comprises incorporating into polyvinyl chloride a substantially homogeneous composition obtained by heating at a temperature in the range of from about 140° C. to about 200° C. a mixture comprising a plasticizer for polyvinyl chloride, from about 1 to about 10 parts by weight of N-isopropyl toluenesulfonamide per 100 parts of polyvinyl chloride, and from about 0.1 to about 5 parts by weight of copper 8-quinolinolate per 100 parts of polyvinyl chloride.

References Cited in the file of this patent.

UNITED STATES PATENTS

| Number | Name | Date |
|---|---|---|
| 2,490,100 | Smith | Dec. 6, 1949 |
| 2,567,905 | Field | Sept. 11, 1951 |